(12) United States Patent
Hansen et al.

(10) Patent No.: US 9,826,373 B2
(45) Date of Patent: *Nov. 21, 2017

(54) WLAN TRANSMITTER HAVING HIGH DATA THROUGHPUT

(71) Applicant: BROADCOM CORPORATION, Irvine, CA (US)

(72) Inventors: Christopher J. Hansen, Los Altos, CA (US); Jason A. Trachewsky, Menlo Park, CA (US); Nambirajan Seshadri, Irvine, CA (US); Kelly Brian Cameron, Irvine, CA (US); Hau Thien Tran, Irvine, CA (US); Ba-Zhong Shen, Irvine, CA (US)

(73) Assignee: AVAGO TECHNOLOGIES GENERAL IP (SINGAPORE) PTE. LTD, Singapore (SG)

( * ) Notice: Subject to any disclaimer, the term of this patent is extended or adjusted under 35 U.S.C. 154(b) by 276 days.

This patent is subject to a terminal disclaimer.

(21) Appl. No.: 14/623,003

(22) Filed: Feb. 16, 2015

(65) Prior Publication Data
US 2015/0163650 A1 Jun. 11, 2015

Related U.S. Application Data

(63) Continuation of application No. 13/245,362, filed on Sep. 26, 2011, now Pat. No. 8,964,895, which is a
(Continued)

(51) Int. Cl.
*H04L 27/36* (2006.01)
*H04W 4/18* (2009.01)
(Continued)

(52) U.S. Cl.
CPC ............. *H04W 4/18* (2013.01); *H04L 1/0057* (2013.01); *H04L 1/0059* (2013.01);
(Continued)

(58) Field of Classification Search
CPC ..... H04L 27/34; H04L 27/362; H04L 1/0057; H04L 1/0059; H04L 1/0065; H04L 1/0066; H04L 1/0068
(Continued)

(56) References Cited

U.S. PATENT DOCUMENTS

2005/0085237 A1* 4/2005 Yang .................. H03H 17/0286
455/452.2

FOREIGN PATENT DOCUMENTS

EP 1241905 A1 9/2002
EP 1283600 A1 2/2003

OTHER PUBLICATIONS

European Patent Office; Communication pursuant to 94(3) EPC; EP Application No. 05002188.0; dated Oct. 30, 2015; 6 pgs.
(Continued)

*Primary Examiner* — Helene Tayong
(74) *Attorney, Agent, or Firm* — Garlick & Markison; Harry S. Tyson, Jr.

(57) ABSTRACT

A wireless local area network (WLAN) transmitter includes a baseband processing module and a plurality of radio frequency (RF) transmitters. The processing module selects one of a plurality of modes of operation based on a mode selection signal. The processing module determines a number of transmit streams based on the mode selection signal. The processing of the data further continues by converting encoded data into streams of symbols in accordance with the number of transmit streams and the mode selection signal. A number of the plurality of RF transmitters are enabled based on the mode selection signal to convert a corresponding one of the streams of symbols into a corresponding RF signal such that a corresponding number of RF signals is produced.

20 Claims, 14 Drawing Sheets

Related U.S. Application Data continuation of application No. 10/856,023, filed on May 28, 2004, now Pat. No. 8,059,740.

(60) Provisional application No. 60/545,854, filed on Feb. 19, 2004.

(51) Int. Cl.
*H04L 1/00* (2006.01)
*H04L 1/06* (2006.01)
*H04L 25/03* (2006.01)
*H04L 27/26* (2006.01)
*H04W 84/12* (2009.01)
*H04W 88/10* (2009.01)

(52) U.S. Cl.
CPC .......... *H04L 1/0065* (2013.01); *H04L 1/0066* (2013.01); *H04L 1/0068* (2013.01); *H04L 1/0071* (2013.01); *H04L 1/0618* (2013.01); *H04L 25/03866* (2013.01); *H04L 27/2601* (2013.01); *H04W 84/12* (2013.01); *H04W 88/10* (2013.01)

(58) Field of Classification Search
USPC .......................................... 375/298, 265, 261
See application file for complete search history.

(56) References Cited

OTHER PUBLICATIONS

Krstic et al.; Implementation of an IEEE 802.11a compliant low-power basedband process; 6th International Conference on Telecommunications in Modem Satellite, Cable and Broadcasting Service; Oct. 1-3, 2003; pp. 97-100; vol. 1.

Gosse et al.; Accepted from open call—The evolution of 5 GHz WLAN toward higher throughputs; IEEE Personal Communications; Dec. 1, 2003; pp. 6-13; vol. 10, No. 6.

Stephens; Functional Requirements; 11-03-0813-05-000n-functional-requirements; IEEE Draft; Nov. 13, 2003; pp. 1-7; vol. 802.11n, No. 5.

European Patent Office; Office Action; EP Application No. 05002188.0; Communication pursuant to Art 94(3) EPC; dated Aug. 17, 2016; pp. 1-11.

* cited by examiner

RF transmitter 68 - 72

RF receiver 76 - 80

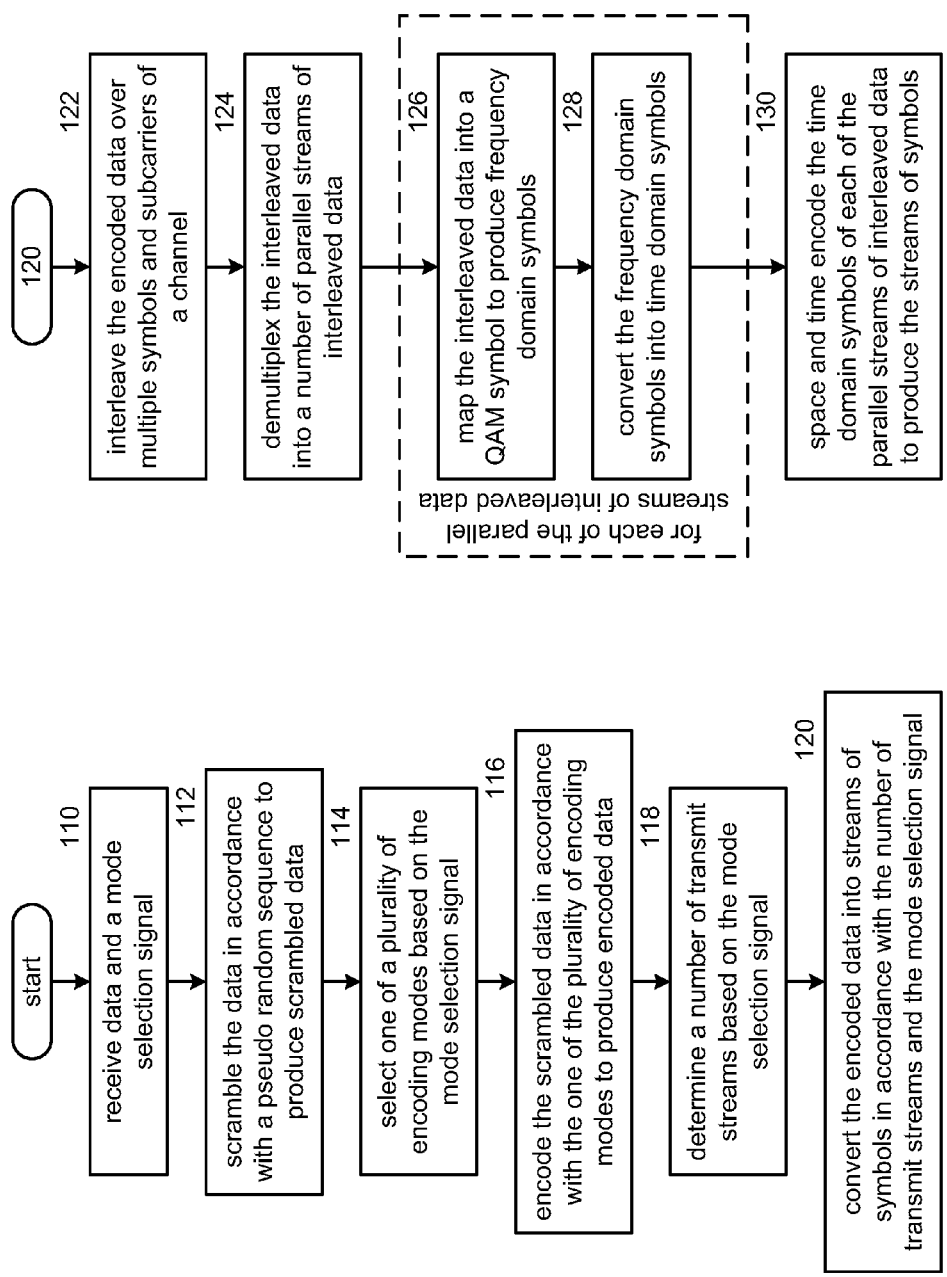

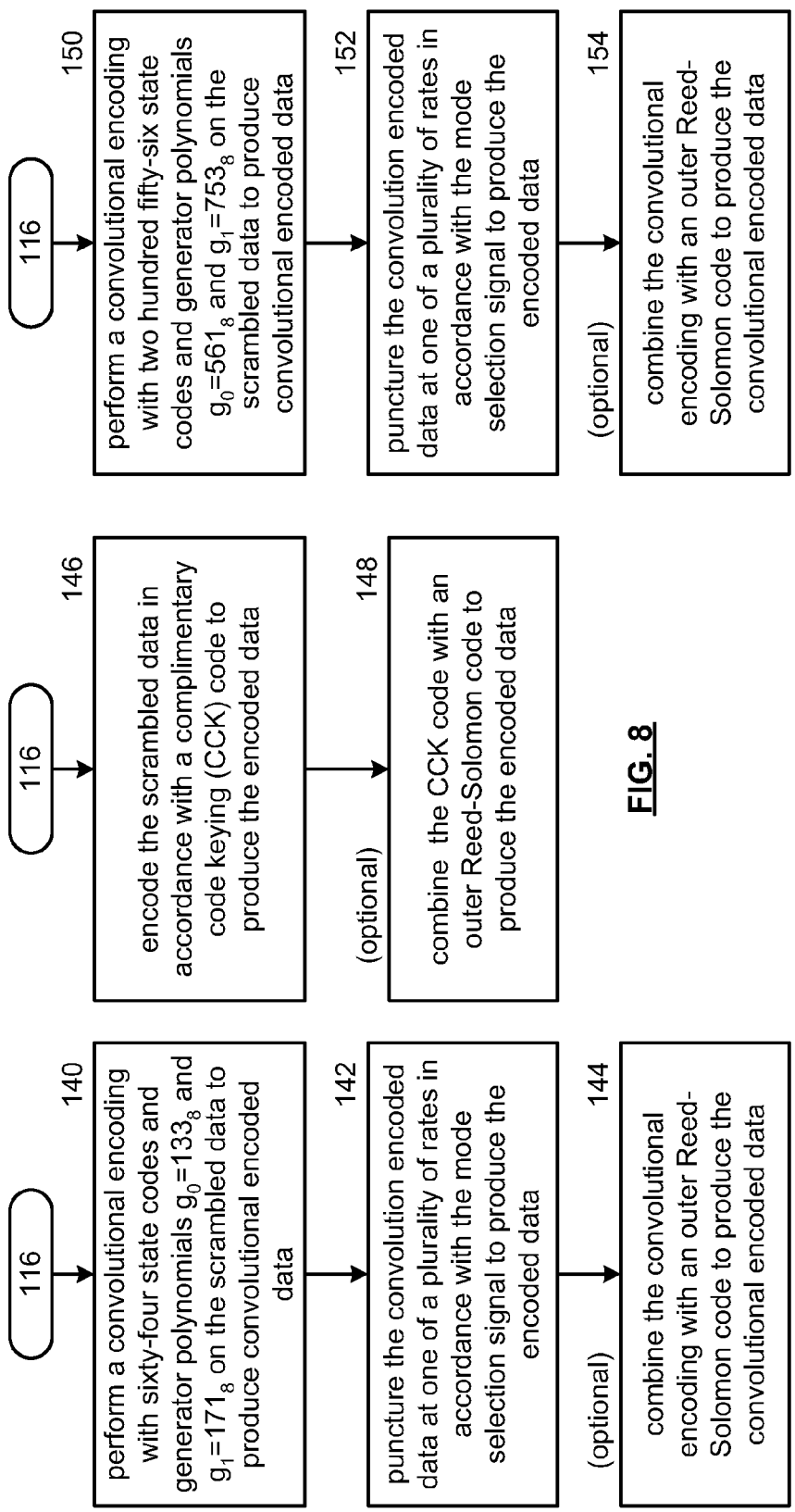

FIG. 7 perform a convolutional encoding with sixty-four state codes and generator polynomials $g_0=133_8$ and $g_1=171_8$ on the scrambled data to produce convolutional encoded data
140 puncture the convolution encoded data at one of a plurality of rates in accordance with the mode selection signal to produce the encoded data
142

(optional) combine the convolutional encoding with an outer Reed-Solomon code to produce the convolutional encoded data
144

FIG. 8 encode the scrambled data in accordance with a complimentary code keying (CCK) code to produce the encoded data
146

(optional) combine the CCK code with an outer Reed-Solomon code to produce the encoded data
148

FIG. 9 perform a convolutional encoding with two hundred fifty-six state codes and generator polynomials $g_0=561_8$ and $g_1=753_8$ on the scrambled data to produce convolutional encoded data
150 puncture the convolution encoded data at one of a plurality of rates in accordance with the mode selection signal to produce the encoded data
152

(optional) combine the convolutional encoding with an outer Reed-Solomon code to produce the convolutional encoded data
154

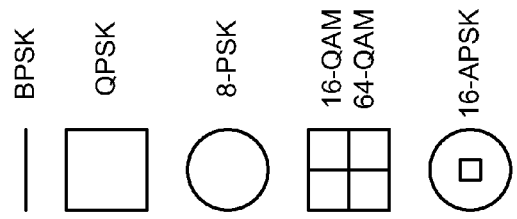
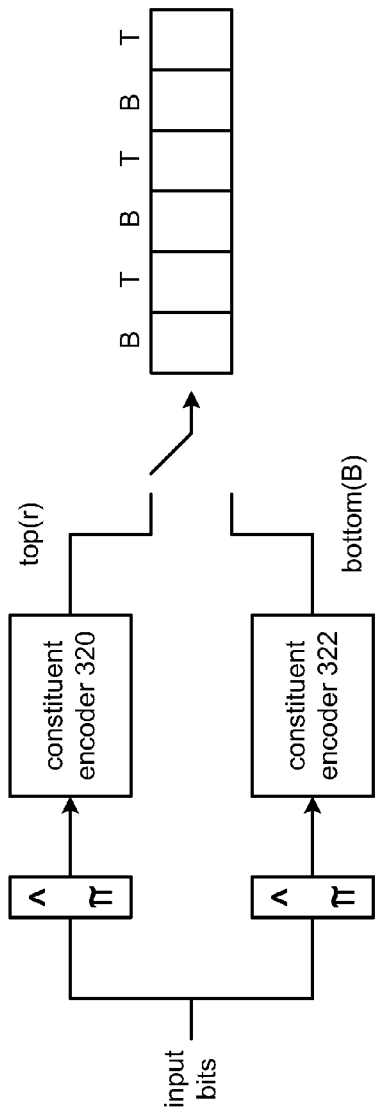
FIG. 12
channel encoder 174
(turbo encoder)
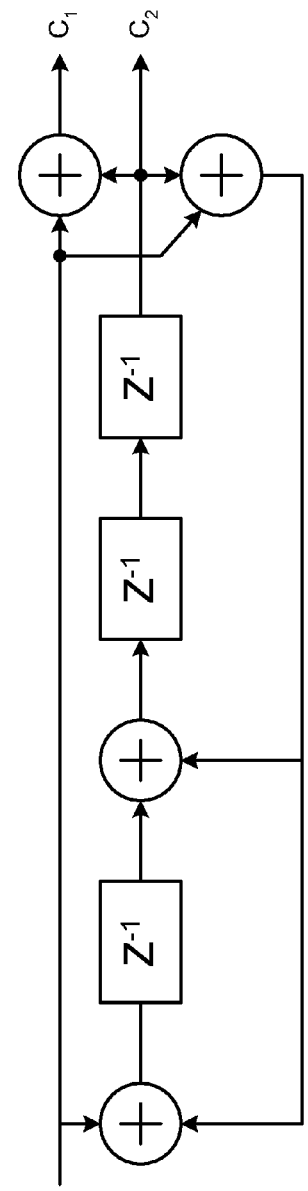
FIG. 13
constituent encoder 320, 322
(rate ½ encoder)

constituent encoder 320,322
(rate 2/5 encoder)

punctured encoder punctured encoder

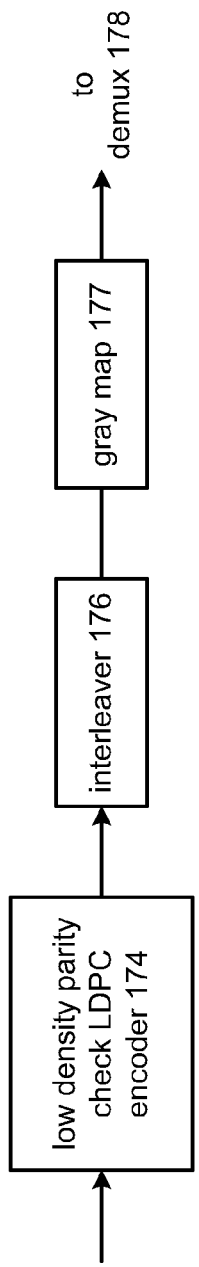
FIG. 18
LDPC code bit
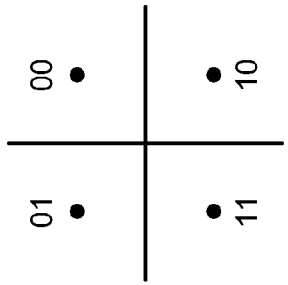
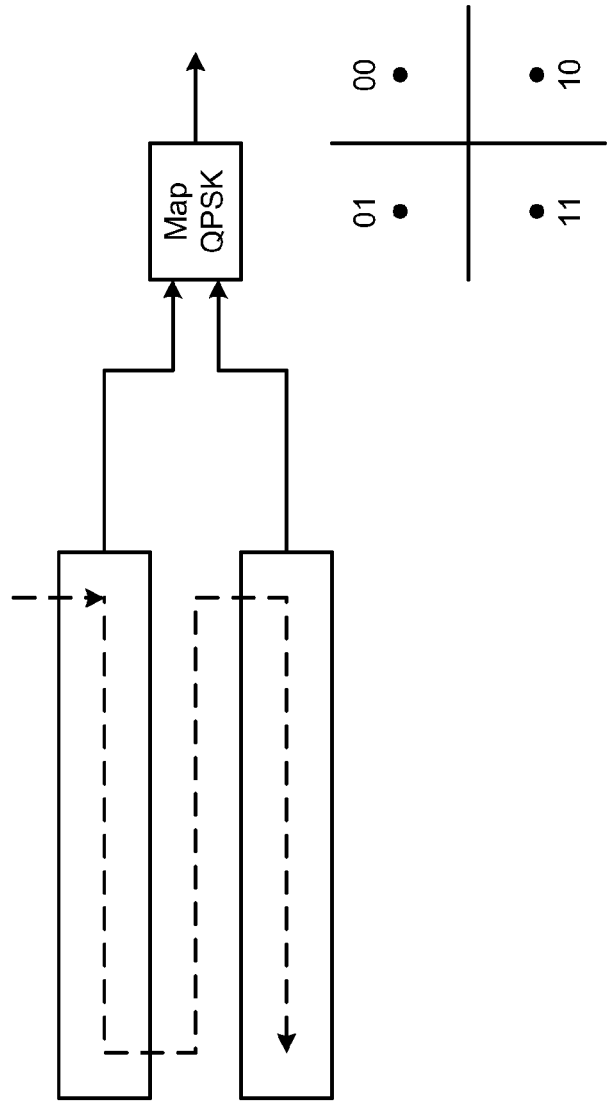
FIG. 19
interleaver 176

WLAN TRANSMITTER HAVING HIGH DATA THROUGHPUT

CROSS REFERENCE TO RELATED PATENTS/PATENT APPLICATIONS

The present U.S. Utility patent application claims priority pursuant to 35 U.S.C. §120 as a continuation of U.S. Utility application Ser. No. 13/245,362, entitled "WLAN transmitter having high data throughput", filed Sep. 26, 2011, which is a continuation of U.S. Utility application Ser. No. 10/856,023, entitled "WLAN transmitter having high data throughput", filed May 28, 2004, now U.S. Pat. No. 8,059,740, which claims priority pursuant to 35 U.S.C. §119(e) to U.S. Provisional Application No. 60/545,854, entitled "WLAN transmitter having high data throughput", filed Feb. 19, 2004, all of which are hereby incorporated herein by reference in their entirety and made part of the present U.S. Utility patent application for all purposes.

BACKGROUND OF THE INVENTION

Technical Field of the Invention

This invention relates generally to wireless communication systems and more particularly to a transmitter transmitting at high data rates with such wireless communication systems.

Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SOSI) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard. As such, a transmitter capable of MIMO wireless communications should also be backward compatible with legacy devices to function in a majority of existing WLANs.

Therefore, a need exists for a WLAN transmitter that is capable of high data throughput and is backward compatible with legacy devices.

BRIEF SUMMARY OF THE INVENTION

The WLAN transmitter having a high data throughput of the present invention substantially meets these needs and others. In one embodiment, a wireless local area network (WLAN) transmitter includes a baseband processing module and a plurality of radio frequency (RF) transmitters. The baseband processing module is operably coupled to process data by scrambling the data in accordance with a pseudo random sequence to produce scrambled data. The processing of the data continues by selecting one of a plurality of encoding modes based on a mode selection signal. The processing of the data continues by encoding the scrambled data in accordance with the one of the plurality of encoding modes to produce encoded data. The processing of the data continues by determining a number of transmit streams based on the mode selection signal. The processing of the data further continues by converting the encoded data into streams of symbols in accordance with the number of transmit streams and the mode selection signal. A number of the plurality of RF transmitters are enabled based on the mode selection signal to convert a corresponding one of the streams of symbols into a corresponding RF signal such that a corresponding number of RF signals is produced.

In another embodiment, a wireless local area network (WLAN) transmitter having high data throughput includes a scramble module, an encoding module, an interleaving module, a demultiplexing module, a plurality of symbol mapping modules, a plurality of frequency domain to time domain conversion modules, a space and time encoding module, and a plurality of radio frequency (RF) transmitters. The scramble module is operably coupled to scramble data in accordance with a pseudo random sequence to produce scrambled data. The encoding module is operably coupled to encode the scrambled data in accordance with one of a plurality of encoding modes to produce encoded data, wherein the one of the plurality of encoding modes is selected in accordance with a mode selection signal. The interleaving module is operably coupled to interleave the encoded data in accordance with the mode selection signal to produce interleaved data. The demultiplexing module is operably coupled to convert the interleaved data into one or more streams of interleaved data based on the mode selection signal. Of the plurality of symbol mapping modules, one or more of them is active to map, in accordance with the mode selection signal, the interleaved data of a corresponding stream of the one or more streams of interleaved data into a mapped symbols, wherein the one or more of the plurality of symbol mapping modules produces one or more streams of mapped symbols. Of the plurality of frequency domain to time domain conversion modules, one or more of them converts a corresponding stream of the one or more streams of mapped symbols into time domain symbols, wherein the one or more of the plurality of frequency domain to time domain conversion modules produce one or more streams of time domain symbols. The space and time encoding module is operably coupled to convert the one or more streams of time domain symbols into one or more streams of spatially adjusted time domain symbols. Of the plurality of RF transmitters, one or more of them is active, based on the mode selection signal, to convert the one or more streams of spatially adjusted time domain symbols into one or more RF signals.

BRIEF DESCRIPTION OF THE SEVERAL VIEWS OF THE DRAWINGS

FIG. 5 is a logic diagram of a method for baseband processing of data in accordance with the present invention;

FIG. 6 is a logic diagram that provides an embodiment of the encoding step of FIG. 5;

FIGS. 7-9 illustrate logic diagrams of various embodiments for encoding the scrambled data in accordance with the present invention;

FIG. 12 is a schematic block diagram of a channel encoder in accordance with the present invention;

FIG. 13 is a schematic block diagram of a constituent encoder in accordance with the present invention;

FIG. 18 is a schematic block diagram of a low density parity check encoder in accordance with the present invention; and FIG. 19 is an illustration of an interleaver in accordance with the present invention.

DETAILED DESCRIPTION OF THE INVENTION

Figure 1:
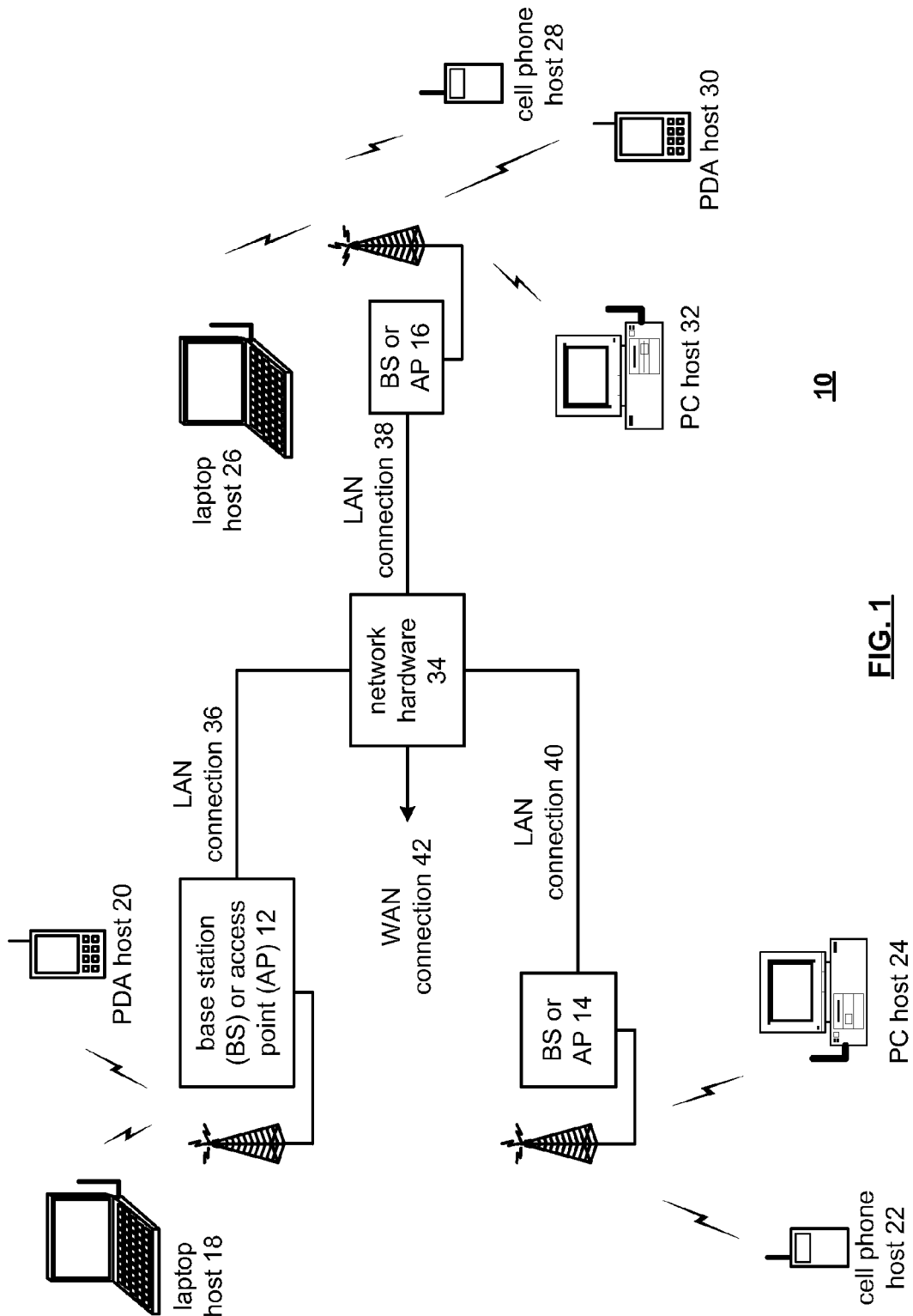
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
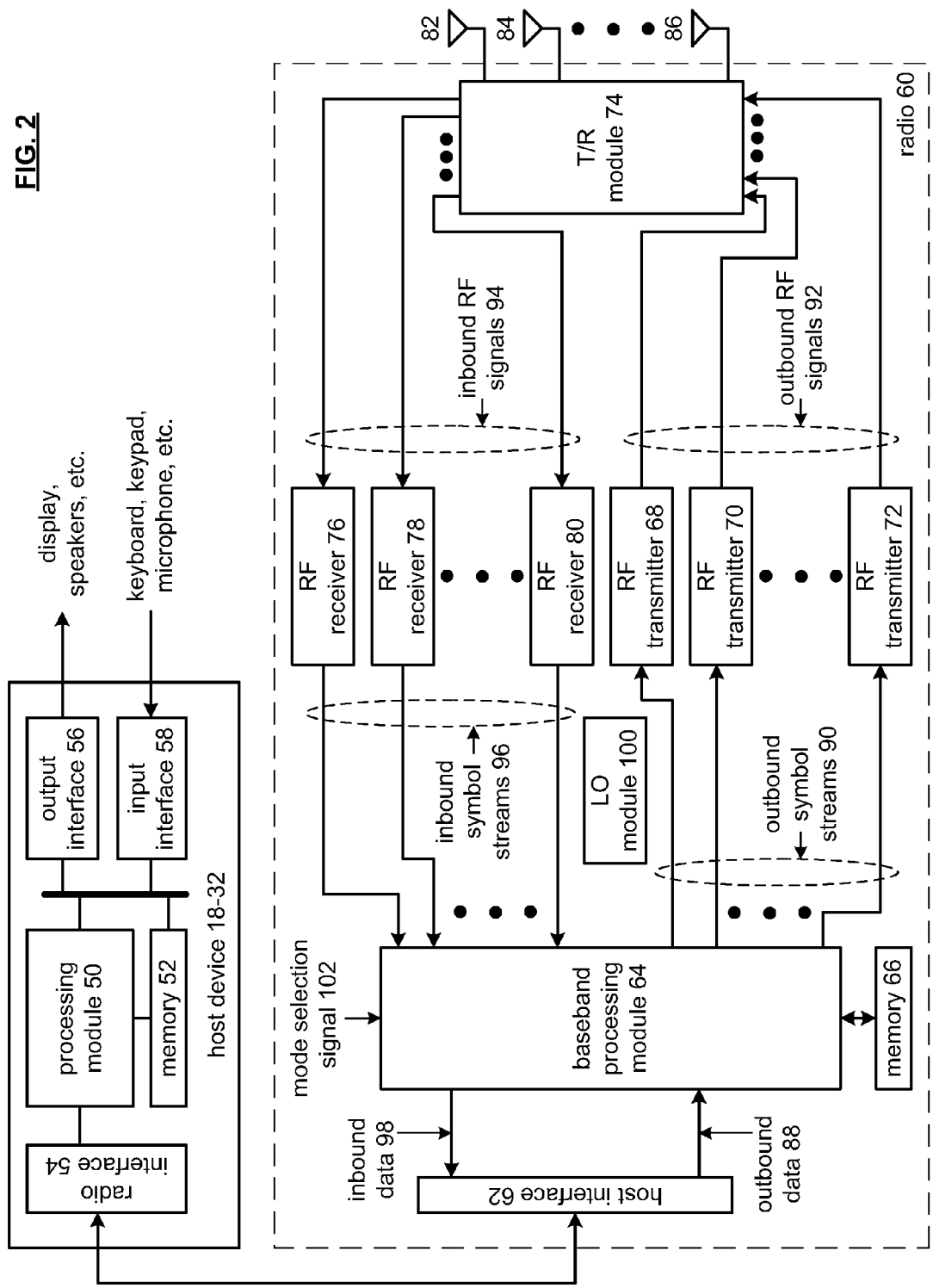
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to FIGS. 5-19, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS), error vector magnitude in decibels (EVM), sensitivity which indicates the maximum receive power required to obtain a target packet error rate (e.g., 10% for IEEE 802.11a), adjacent channel rejection (ACR), and an alternate adjacent channel rejection (AACR).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennas may be utilized to achieve the higher bandwidths. In this instance, the mode select would further indicate the number of antennas to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. [Table 8 is 45 GHz frequency band.] The corresponding table 8 includes various bit rates ranging from 12 megabits-per-second to 216 megabits-per-second utilizing 2-4 antennas and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennas and a corresponding spatial time code rate. Table 10 further illustrates a particular modulation scheme code rate and NBPSC values. Table 11 provides the power spectral density mask for table 10 and table 12 provides the channelization for table 10.

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
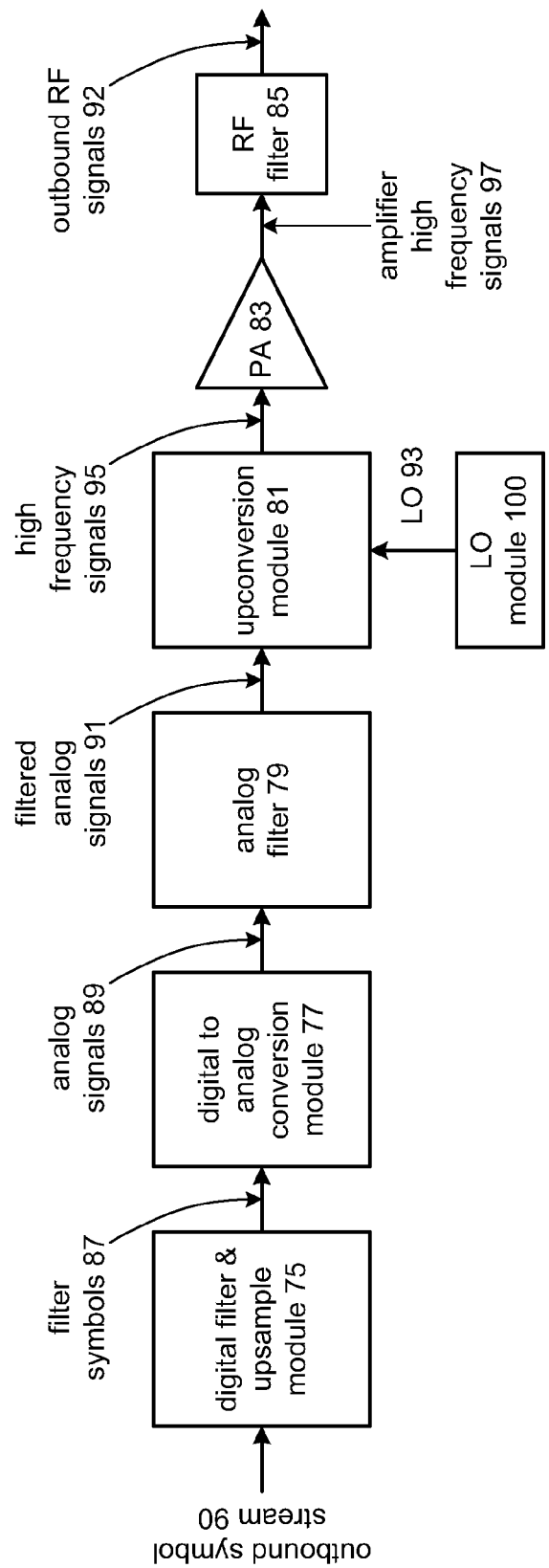
FIG. 3 is a schematic block diagram of an RF transmitter in accordance with the present invention.

FIG. 3 is a schematic block diagram of an embodiment of an RF transmitter 68-72. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
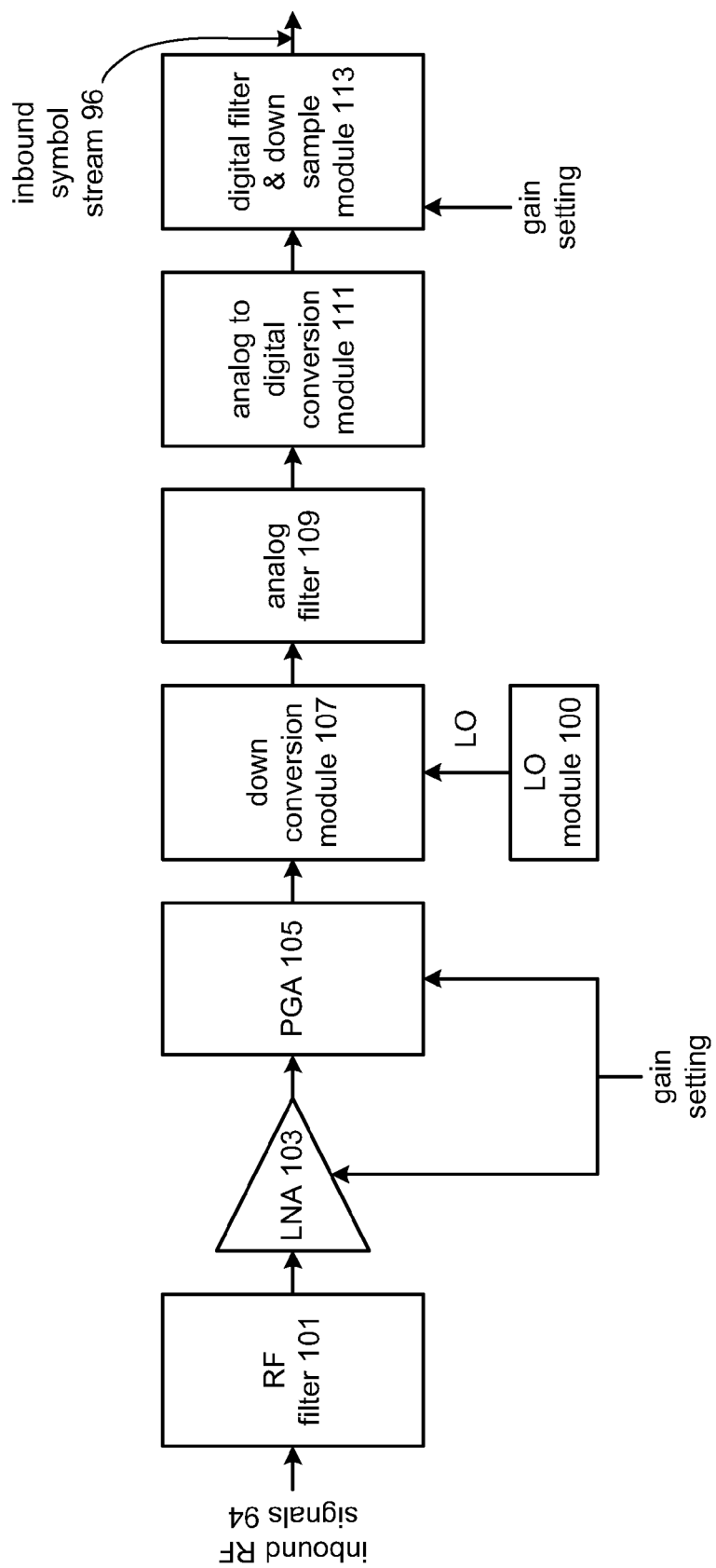
FIG. 4 is a schematic block diagram of an RF receiver in accordance with the present invention.

FIG. 4 is a schematic block diagram of each of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the inbound symbol stream 96.

FIG. 5 is a logic diagram of a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing a parallel concatenated turbo encoding scheme and/or a low density parity check block encoding scheme. Such encoding schemes will be described in greater detail with reference to FIGS. 12-19. Alternatively, the encoding may be done as further described in FIGS. 7-9 which will be described below.

The process then proceeds to Step 118 where the baseband processing module determines a number of transmit streams based on the mode select signal. For example, the mode select signal will select a particular mode which indicates that 1, 2, 3, 4 or more antennas may be utilized for the transmission. Accordingly, the number of transmit streams will correspond to the number of antennas indicated by the mode select signal. The process then proceeds to Step 120 where the baseband processing module converts the encoded data into streams of symbols in accordance with the number of transmit streams in the mode select signal. This step will be described in greater detail with reference to FIG. 6.

FIG. 6 is a logic diagram of a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data.

The number of parallel streams corresponds to the number of transmit streams, which in turn corresponds to the number of antennas indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=M+1. In one embodiment the encoding matrix may comprise a form of:

$$\begin{bmatrix} C_1 & C_2 & C_3 & \cdots & C_{2M-1} \\ -C_2^* & C_1^* & C_4 & \cdots & C_{2M} \end{bmatrix}$$

where the number of rows of the encoding matrix corresponds to M and the number of columns of the encoding matrix corresponds to P. The particular values of the constants within the encoding matrix may be real or imaginary numbers.

FIG. 7 is a logic diagram of one method that may be utilized by the baseband processing module to encode the scrambled data at Step 116 of FIG. 5. In this method, the process begins at Step 140 where the baseband processing module performs a convolutional encoding with 64 state codes and generator polynomials of $G_0=133_8$ and $G_1=171_8$ on the scrambled data to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔rds and/or ¾, or any rate as specified in tables 1-12. Note that, for a particular mode, the rate may be selected for backward compatibility with IEEE 802.11(a) and/or IEEE 802.11(g) rate requirements.

The encoding of FIG. 7 may further include an optional Step 144 where the baseband processing module combines the convolutional encoding with an outer Reed Solomon code to produce the convolutional encoded data. Note that Step 144 would be conducted in parallel with Step 140.

FIG. 8 is a logic diagram of another encoding method that may be utilized by the baseband processing module to encode the scrambled data at Step 116 of FIG. 5. In this embodiment, the process begins at Step 146 where the baseband processing module encodes the scrambled data in accordance with a complimentary code keying (CCK) code to produce the encoded data. This may be done in accordance with IEEE 802.11(b) specifications and/or IEEE 802.11(g) specifications. The encoding may include an optional Step 148, which is performed in parallel with Step 146 that combines the CCK code with an outer Reed Solomon code to produce the encoded data.

FIG. 9 is a logic diagram of yet another method for encoding the scrambled data at Step 116, which may be performed by the baseband processing module. In this embodiment, the process begins at Step 150 where the baseband processing module performs a convolutional encoding with 256 state codes and generator polynomials of $G_0=561_8$ and $G_1=753_8$ on the scrambled data to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
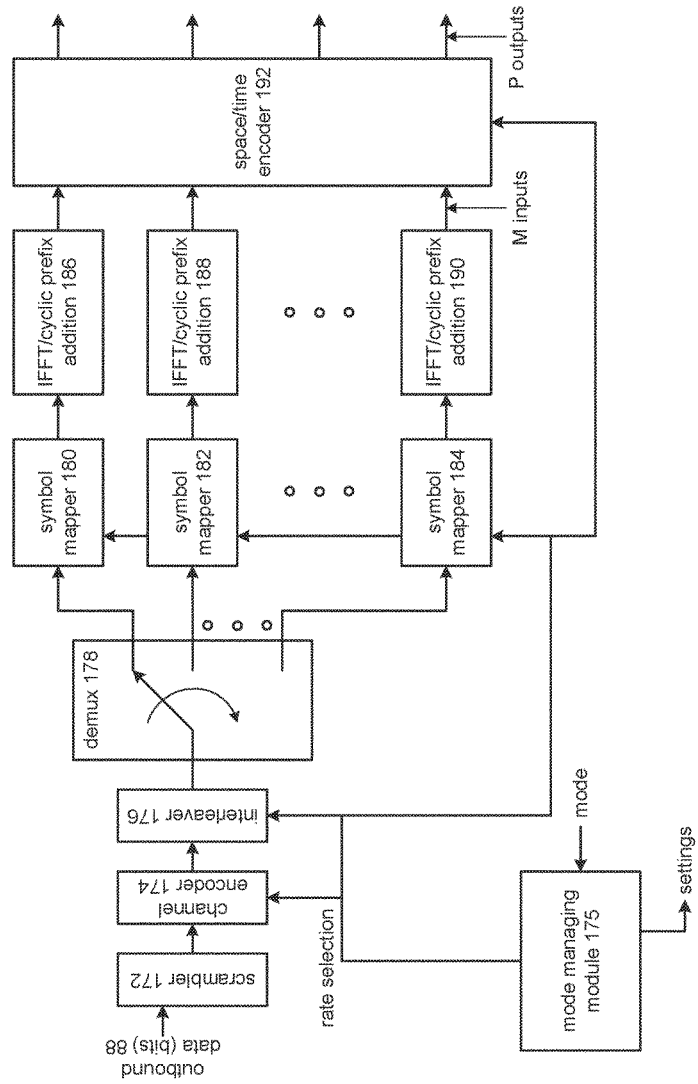
FIGS. 10A and 10B are a schematic block diagram of a radio transmitter in accordance with the present invention.
Figure 10B:
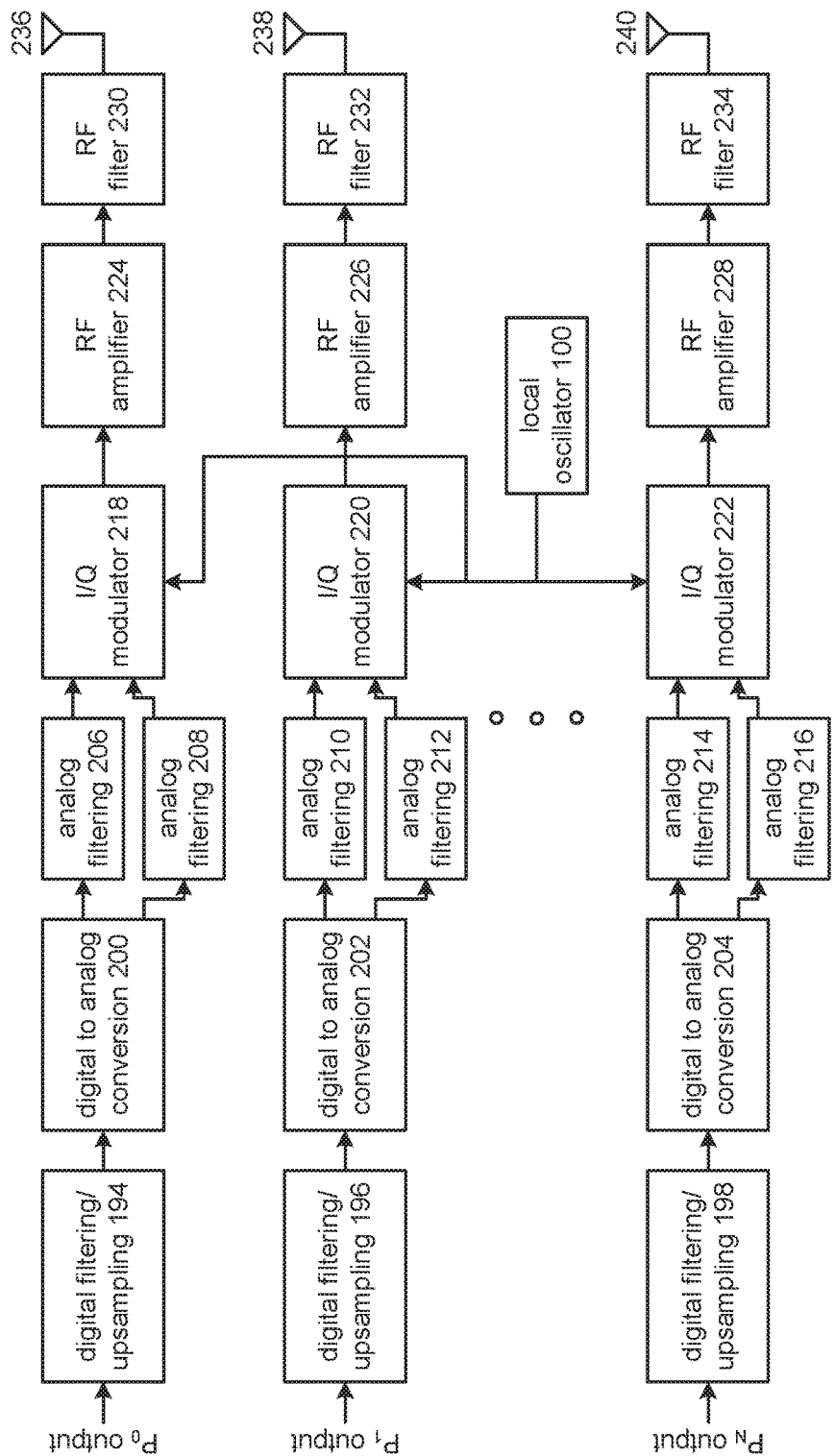

FIGS. 10A and 10B illustrate a schematic block diagram of a multiple transmitter in accordance with the present invention. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal and produces settings for the radio transmitter portion and produces the rate selection for the baseband portion.

In operations, the scrambler 172 adds (in GF2) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of ½, ⅔rds and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to FIGS. 12-19.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal M+1 paths. For each of the paths, the space/time encoder multiples the input symbols with an encoding matrix that has the form of $$\begin{bmatrix} C_1 & C_2 & C_3 & \cdots & C_{2M-1} \\ -C_2^* & C_1^* & C_4 & \cdots & C_{2M} \end{bmatrix}$$

Note that the rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennas 236-240. The P-outputs from the space/time encoder 192 are received by respective digital filtering/up-sampling modules 194-198.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222, based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennas 236-240.

Figure 11A:
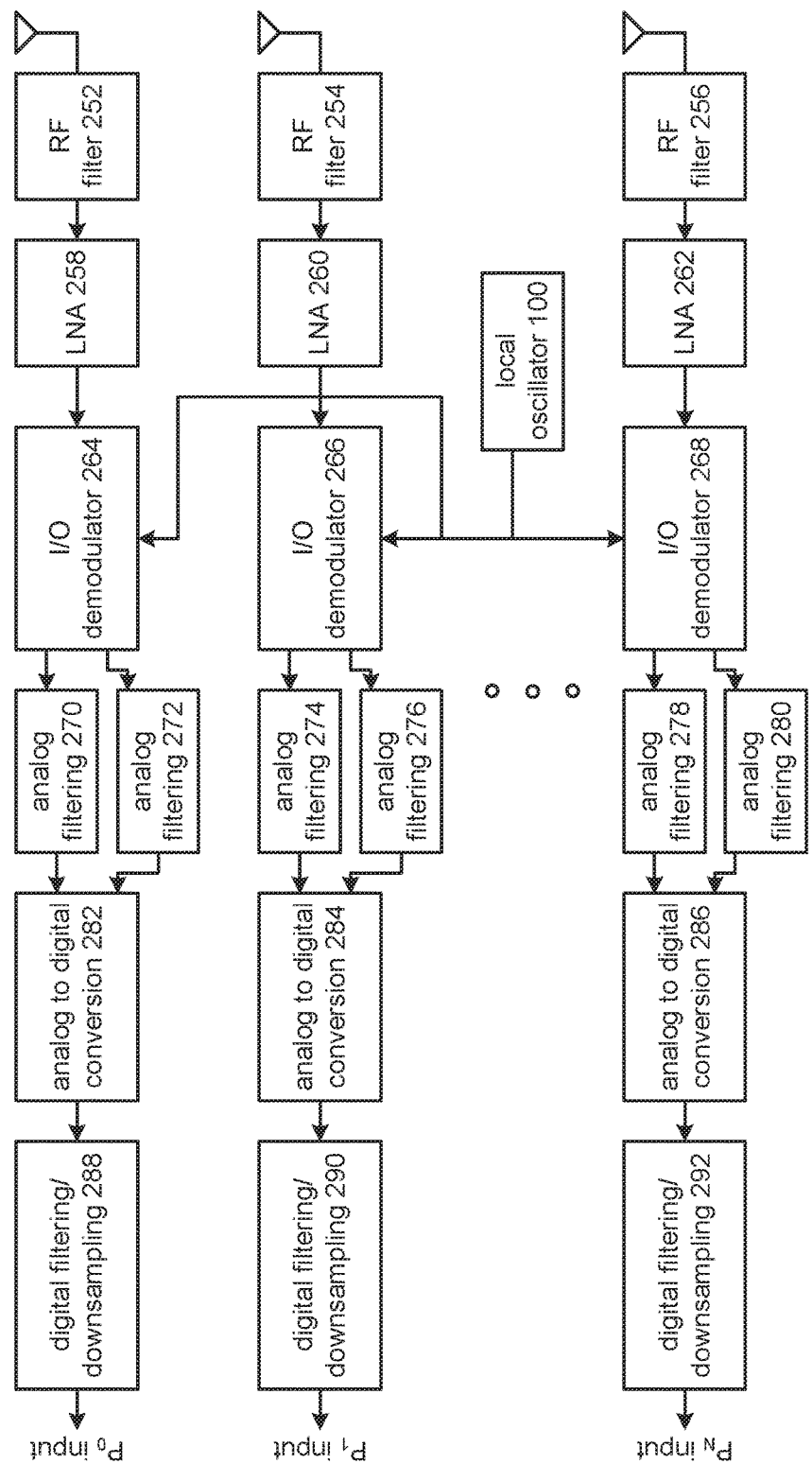
FIGS. 11A and 11B are a schematic block diagram of a radio receiver in accordance with the present invention.
Figure 11B:
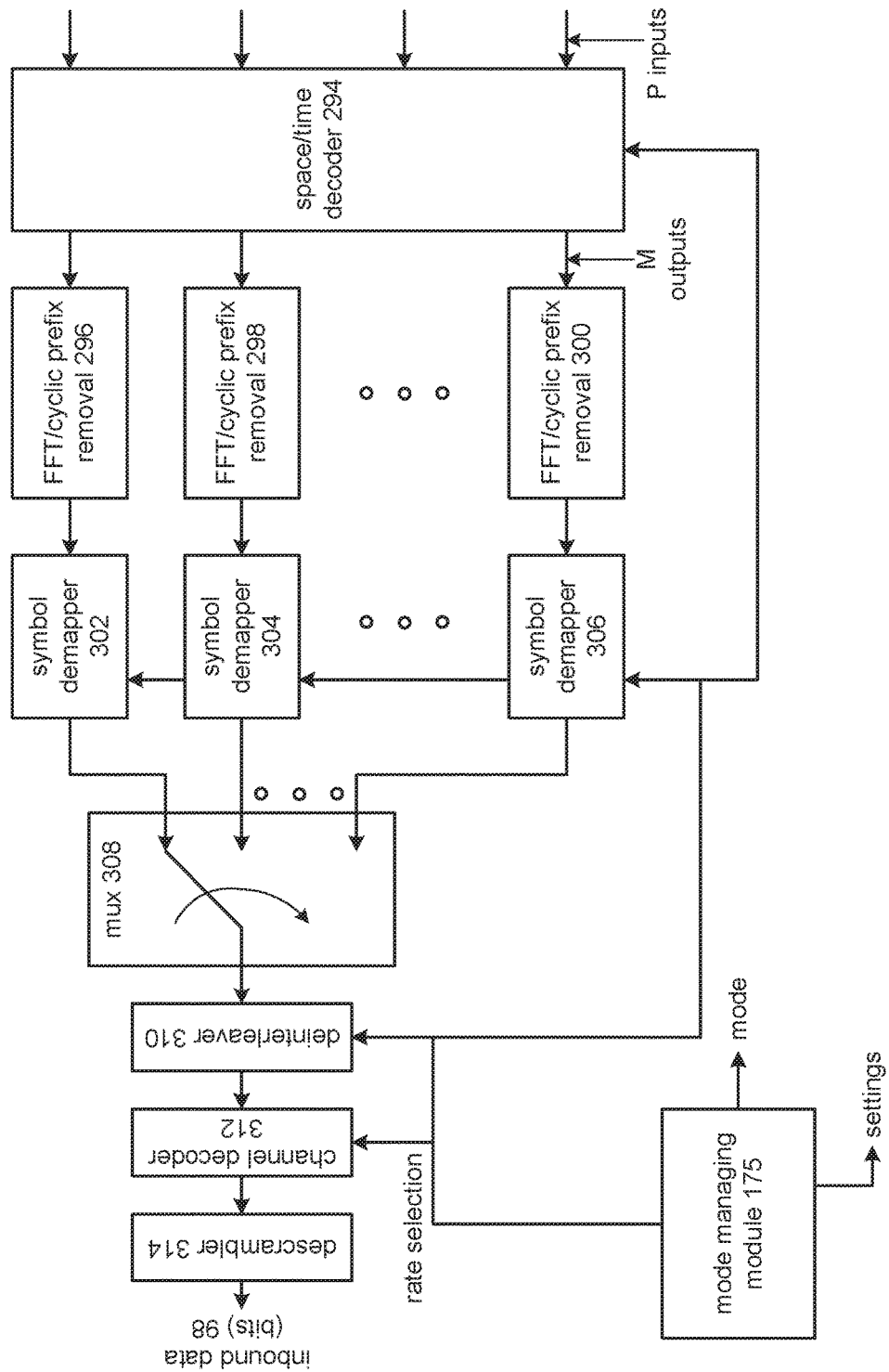

FIGS. 11A and 11B illustrate a schematic block diagram of another embodiment of a receiver in accordance with the present invention. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennas receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

FIG. 12 is a schematic block diagram of channel encoder 174 implemented as a turbo encoder. In this embodiment, the turbo encoder receives input bits, modifies them, processes them via a constituent encoder 320-322 and interleaves them to produce the corresponding encoded output. Depending on the particular symbol mapping (BPSK, QPSK, 8PSK (phase shift keying), 64 QAM, 16 QAM or 16APSK (amplitude phase shift keying), the turbo encoder will function in the same manner to produce the encoded data. For instance, of $\pi_0$ and $\pi_1$ are interleaves of MSB (most significant bit) and LSB (least significant bit), respectively, for a block of 2-bit symbols and $\pi_L^{-1}$, L=0, are the inverses, then the modified interleave is as follows:

$$\pi''l(i) = \begin{pmatrix} i : i\bmod 2 = 0 \\ \pi - 1(i) : i\bmod 2 = 1 \end{pmatrix} \text{ and }$$

$$\pi l(i) = \begin{pmatrix} i : i\bmod 2 = 1 \\ \pi(i) : i\bmod 2 = 0 \end{pmatrix}$$

FIG. 13 illustrates an embodiment of the constituent encoders 320-322 of FIG. 12 which may be implemented as rate 1/2 encoders.

Figure 14:
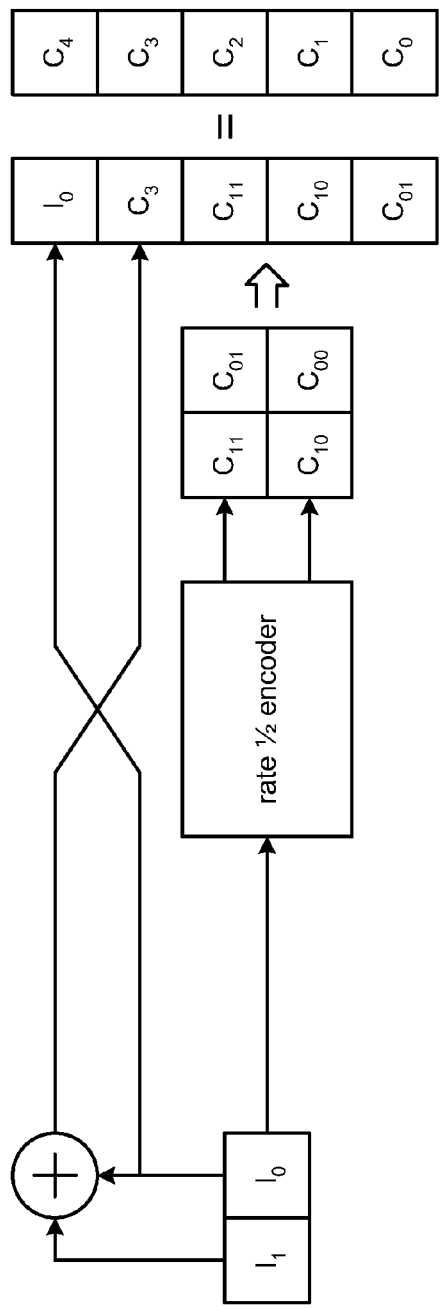
FIG. 14 is a schematic block diagram of an alternate embodiment of a constituent encoder in accordance with the present invention.

FIG. 14 illustrates a schematic block diagram of another embodiment of a constituent encoder 320-322 that utilizes the 1/2 rate encoder to produce a rate 2/5ths encoder. In this embodiment, two consecutive binary inputs are sent to the rate 1/2 encoder. The output of the rate 2/5 encoder is produced as shown.

Figure 15:
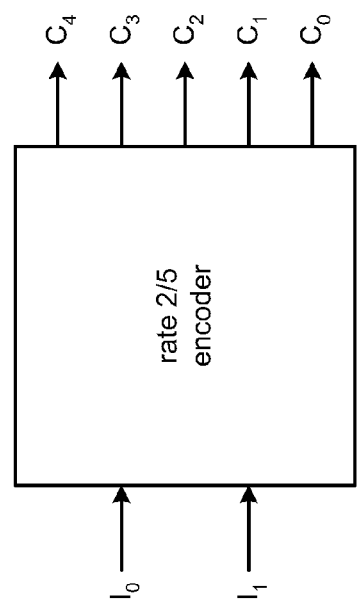
FIG. 15 is a schematic block diagram of a rate 2/5 encoder in accordance with the present invention.
Figure 17:
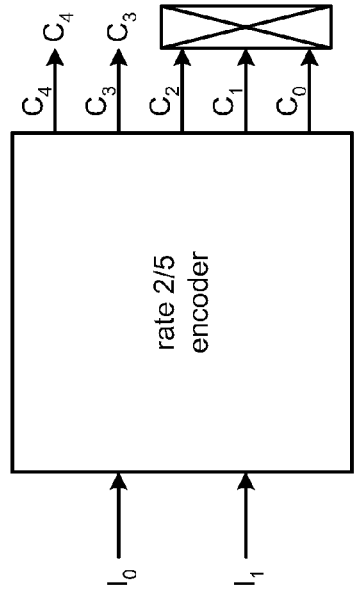
FIG. 17 is a schematic block diagram of another embodiment of a puncture encoder in accordance with the present invention.
Figure 16:
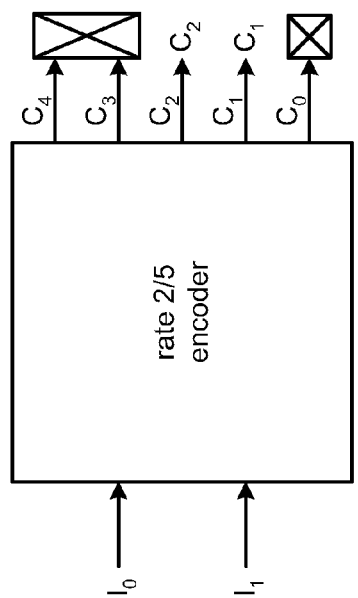
FIG. 16 is a schematic block diagram of a puncture encoder in accordance with the present invention.

FIG. 15 represents the generally functionality of FIG. 14. The rate 2/5ths encoder may then be utilized as puncture encoders as shown in FIGS. 16 and 17, which have the corresponding QPSK mapping.

FIG. 18 illustrates the channel encoder 174 being implemented as a low density parity check (LDPC) encoder. In this embodiment, the encoder includes a low density parity check encoder 174, an interleaver 176 and a gray mapping module 177. The block length may be 2000 and the information length may be 1600. In this instance, the low density parity check binary matrix H=[H$_1$, H$_2$], where H$_1$ is an irregular 400×1600 low density matrix with 1400 columns of weight 3 and 200 columns of weight 7, and all rows of weight 14. Moreover, the distribution of the 1's is pseudo random in order to suit a hardware embodiment. The matrix H$_2$ is a 400×400 matrix which provides a long path with no loops in the bipartite graph between redundancy bit node and check node.

$$H2 = \begin{vmatrix} 100 \ldots 00 \\ 11\_ \ldots 00 \\ \_11 \ldots 00 \\ \ldots \\ 000 \ldots 10 \\ 000 \ldots 11 \end{vmatrix}$$

This parity check matrix provides easy encoding. The code has no circle of loops less than 6. The degree distribution of the bipartite graph of the code is listed in the following table. The total number of edges of the graph is 6399.

| | number of nodes |
|---|---|
| bit node degree (number of edges emitted from a bit node) | |
| 1 | 1 |
| 2 | 399 |
| 3 | 1400 |
| 7 | 200 |
| check node degree | |
| 15 | 1 |
| 16 | 399 |

FIG. 19 illustrates a particular interleaving that may be utilized by the encoder of FIG. 18. In this embodiment, the rate of the code may be 1/2 and the LDPC code is symmetric. As such, the interleaving is as shown.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments of a multiple input/multiple output transceiver for use in wireless communication systems. As one of average skill in the art will appreciate, other embodiments may be derived from the teaching of the present invention without deviating from the scope of the claims.

Mode Selection Tables:

TABLE 1

| 2.4 GHz, 20/22 MHz channel BW, 54 Mbps max bit rate | | | | | | | | |
|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

| Channelization for Table 1 | |
|---|---|
| Channel | Frequency (MHz) |
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

| Power Spectral Density (PSD) Mask for Table 1 PSD Mask 1 | |
|---|---|
| Frequency Offset | dBr |
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |

TABLE 12-continued

Channelization for Table 10

| Channel | Frequency (MHz) | Country | Channel | Frequency (MHz) | County |
|---|---|---|---|---|---|
| 151 | 5755 | USA | | | |
| 159 | 5795 | USA | | | |

What is claimed is:

1. A method of a wireless local area network (WLAN) transmitter to transmit in accordance with a plurality of 802.11 wireless communication modes of operation, comprising:
generating, by a baseband processor in the WLAN transmitter, a mode selection signal that selects one of the plurality of 802.11 wireless communication modes of operation, wherein the mode selection signal indicates for the selected 802.11 wireless communication mode of operation one of a plurality of channel bandwidths and a maximum bit rate for the selected one of the plurality of channel bandwidths;
converting outbound data into a number of parallel transmit streams indicated by the mode selection signal; and
converting the number of parallel transmit streams into a corresponding number of radio frequency (RF) signals, wherein a number of RF transmitters are enabled based on the mode selection signal and wherein the corresponding number of RF signals have the channel bandwidth and maximum bit rate indicated by the mode selection signal.

2. The method of claim 1, further comprises:
determining the 802.11 wireless communication mode of operation by the baseband processor based on operational conditions in a wireless local area network (WLAN).

3. The method of claim 2, wherein the operational conditions in the WLAN include at least one of: protocol diversity of wireless communication devices affiliated with the WLAN, capabilities of a target wireless communication device in the WLAN, or transmitter capabilities.

4. The method of claim 1, wherein the mode selection signal indicates for the selected 802.11 wireless communication mode of operation one or more of the following channel bandwidths: channel bandwidth of 20 MHz or channel bandwidth of 40 MHz.

5. The method of claim 1, wherein converting the outbound data further comprises:
selecting one of a plurality of bit rates of the selected 802.11 wireless communication mode of operation based on the mode selection signal;
selecting one of a plurality of types of modulation of the selected 802.11 wireless communication mode of operation based on the mode selection signal; and
generating the number of parallel transmit streams with the selected bit rate and the selected modulation.

6. The method of claim 5, wherein converting the outbound data further comprises;
selecting one of a plurality of code rates of the selected 802.11 wireless communication mode of operation based on the mode selection signal;
selecting one of a plurality of number of coded bits per subcarrier of the selected 802.11 wireless communication mode of operation based on the mode selection signal; and
generating the number of parallel transmit streams with the selected code rate and the selected number of coded bits per subcarrier.

7. The method of claim 5, wherein the plurality of types of modulation of the selected 802.11 wireless communication mode comprises one or more of: Binary Phase Shift Keying (BPSK); Quadrature Phase Shift Keying (QPSK); Complimentary Code Keying (CCK); or Quadrature amplitude modulation (QAM).

8. A wireless local area network (WLAN) transmitter, the WLAN transmitter comprises:
a baseband processor configured to generate a mode selection signal that selects one of a plurality of channel bandwidths and a number of transmit antennas in accordance with one of a plurality of 802.11 wireless communication modes of operation; and
a plurality of radio frequency (RF) transmitters, wherein a number of the plurality of RF transmitters are enabled based on the mode selection signal, and wherein the number of the plurality of RF transmitters that are enabled generates a corresponding number of RF signals having the channel bandwidth indicated by the mode selection signal, the RF signals communicating a corresponding number of parallel transmit streams of outbound data.

9. The WLAN transmitter of claim 8, wherein the baseband processor is further configured to:
select one of a plurality of encoding modes;
encode data in accordance with the one of the plurality of encoding modes to produce encoded data;
determine a number of transmit streams; and
convert the encoded data into streams of symbols in accordance with the number of transmit streams.

10. The WLAN transmitter of claim 9, wherein the baseband processor is configured to convert the encoded data into streams of symbols by:
interleaving the encoded data over multiple symbols and subcarriers of a channel to produce interleaved data;
demultiplexing the interleaved data into a number of parallel streams of interleaved data, wherein the number of parallel streams corresponds to the number of transmit streams; and
processing the parallel streams of interleaved data to produce the streams of symbols.

11. The WLAN transmitter of claim 10, wherein the baseband processor is operably coupled to process each of the parallel streams of interleaved data to produce the streams of symbols by:
mapping the interleaved data into a quadrature amplitude modulated (QAM) symbol according to one of a plurality of QAM symbols for the selected 802.11 wireless communication mode of operation to produce frequency domain symbols;
converting the frequency domain symbols into time domain symbols; and
space and time encoding the time domain symbols of the parallel streams of interleaved data to produce the streams of symbols.

12. The WLAN transmitter of claim 8, wherein the baseband processor is operably coupled to select the one of the plurality of 802.11 wireless communication modes of operation based on operational conditions in a WLAN.

13. The WLAN transmitter of claim 12, wherein the operational conditions in the WLAN include one or more of: protocol diversity of wireless communication devices affiliated with the WLAN, capabilities of a target wireless communication device in the WLAN, or transmitter capabilities.

14. The WLAN transmitter of claim 8, wherein the baseband processor selects one of a plurality of channel bandwidths including at least: a 20 MHz or a 40 MHz channel bandwidth.

15. The WLAN transmitter of claim 14, wherein the 20 or the 40 MHz channel bandwidth are in a 5 GHz frequency band.

16. A transmitter in a wireless local area network (WLAN), comprising:
   a baseband processor configured to:
      select one of a plurality of 802.11 wireless communication modes of operation, wherein the one of a plurality of 802.11 wireless communication modes of operation indicates one of a plurality of channel bandwidths and a number of antennas; and
      convert outbound data into a plurality of parallel transmit streams; and
   a plurality of radio frequency (RF) transmitters configured to:
      generate, based on the plurality of parallel transmit streams, a number of RF signals corresponding to the selected number of antennas with the selected one of the plurality of channel bandwidths.

17. The transmitter of claim 16, wherein the baseband processor is operable to determine the 802.11 wireless communication mode of operation based on operational conditions in the WLAN.

18. The transmitter of claim 17, wherein the operational conditions include at least one of: protocol diversity of wireless communication devices affiliated with the WLAN, capabilities of a target wireless communication device in the WLAN, or transmitter capabilities.

19. The transmitter of claim 16, wherein the one of the plurality of channel bandwidths includes at least: a channel bandwidth of 20 MHz or a channel bandwidth of 40 MHz.

20. The transmitter of claim 19, wherein the plurality of channel bandwidths are in a frequency band of 5 GHz.

* * * * *